United States Patent
Yeo et al.

(10) Patent No.: US 10,484,975 B2
(45) Date of Patent: Nov. 19, 2019

(54) METHOD AND APPARATUS FOR TRANSMISSION AND RECEPTION OF MULTIPLE TIMING TRANSMISSION SCHEMES IN WIRELESS CELLULAR COMMUNICATION SYSTEM

(71) Applicant: Samsung Electronics Co., Ltd., Suwon-si, Gyeonggi-do (KR)

(72) Inventors: Jeongho Yeo, Hwaseong-si (KR); Jinyoung Oh, Seoul (KR); Sungjin Park, Incheon (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/729,233

(22) Filed: Oct. 10, 2017

(65) Prior Publication Data

US 2018/0103462 A1 Apr. 12, 2018

(30) Foreign Application Priority Data

Oct. 10, 2016 (KR) ........................ 10-2016-0130888

(51) Int. Cl.
*H04W 72/04* (2009.01)
*H04W 88/02* (2009.01)
(Continued)

(52) U.S. Cl.
CPC ... *H04W 72/0406* (2013.01); *H04W 56/0005* (2013.01); *H04W 72/04* (2013.01); *H04W 88/02* (2013.01); *H04W 88/08* (2013.01)

(58) Field of Classification Search
CPC ......... H04W 72/0406; H04W 56/0005; H04W 72/04; H04W 28/0273; H04W 28/06;
(Continued)

(56) References Cited

U.S. PATENT DOCUMENTS 8,953,541 B2 * 2/2015 Jang et al. ........ H04W 56/0045
2009/0175245 A1 7/2009 Harada et al.
(Continued)

FOREIGN PATENT DOCUMENTS

| EP | 2019509 A1 | 1/2009 |
| WO | 2016040290 A1 | 3/2016 |
| WO | 2016159730 A1 | 10/2016 |

OTHER PUBLICATIONS

International Search Report regarding Application No. PCT/KR2017/011130, dated Jan. 11, 2018, 3 pages.
(Continued)

*Primary Examiner* — Meless N Zewdu

(57) ABSTRACT

A communication method and system for converging a 5G communication system supports higher data rates beyond a 4G system with IoT technology. The present disclosure may be applied to intelligent services based on the 5G communication technology and the IoT-related technology, such as smart home, smart building, smart city, smart car, connected car, health care, digital education, smart retail, security and safety services. The present disclosure provides a method for transmission and reception between a base station and a terminal, which can transmit a HARQ-ACK feedback of downlink data or uplink data in various or multiple timings, in accordance with a TA value and a fallback mode.

16 Claims, 13 Drawing Sheets

(51) Int. Cl.
*H04W 88/08* (2009.01)
*H04W 56/00* (2009.01)

(58) Field of Classification Search
CPC .......... H04W 72/0473; H04W 72/005; H04W 72/02; H04W 80/04; H04W 80/06; H04W 72/1278; H04W 4/70; H04W 28/02; H04W 28/0215; H04W 52/81; H04W 52/34; H04W 72/044; H04W 72/0446; H04W 80/00; H04W 56/00; H04W 56/001; H04W 72/0413; H04W 72/1268; H04W 72/1273; H04W 72/1284; H04W 72/1289; H04W 74/004; H04W 88/00; H04W 88/02; H04W 88/08; H04B 7/212; H04D 7/2643

See application file for complete search history.

(56) References Cited

U.S. PATENT DOCUMENTS

| | | | |
|---|---|---|---|
| 2011/0032894 A1 | 2/2011 | Miki et al. | |
| 2012/0320846 A1* | 12/2012 | Papasakellariou et al. | .. 370/329 |
| 2013/0294362 A1* | 11/2013 | Xu et al. | H04W 72/042 |
| 2014/0036747 A1* | 2/2014 | Nory et al. | 370/330 |
| 2014/0071954 A1 | 3/2014 | Au et al. | |
| 2015/0373703 A1* | 12/2015 | Su | H04W 72/0446 |
| 2016/0014752 A1 | 1/2016 | Papasakellariou et al. | |
| 2016/0014802 A1* | 1/2016 | Yang et al. | H04W 72/1278 |
| 2016/0119900 A1* | 4/2016 | You et al. | H04W 72/042 |
| 2016/0165490 A1* | 6/2016 | Nagasaka et al. | H04W 36/0033 |
| 2017/0134880 A1* | 5/2017 | Rico Alvarino et al. | H04W 4/005 |
| 2017/0273077 A1* | 9/2017 | Kim et al. | H04W 72/0446 |
| 2017/0290046 A1* | 10/2017 | Sun et al. | H04W 72/1289 |
| 2017/0332397 A1* | 11/2017 | Li et al. | H04W 72/1268 |
| 2018/0014255 A1* | 1/2018 | Pelletier et al. | H04W 52/146 |
| 2018/0083758 A1* | 3/2018 | Islam et al. | H04L 5/0083 |
| 2018/0199341 A1* | 7/2018 | Baldemair et al. | H04W 72/0453 |
| 2018/0242317 A1* | 8/2018 | Marinier et al. | H04W 72/0446 |

OTHER PUBLICATIONS

European Patent Office, "Supplementary European Search Report," Application No. EP17861079.6, dated Aug. 21, 2019, 6 pages.

* cited by examiner

METHOD AND APPARATUS FOR TRANSMISSION AND RECEPTION OF MULTIPLE TIMING TRANSMISSION SCHEMES IN WIRELESS CELLULAR COMMUNICATION SYSTEM

CROSS-REFERENCE TO RELATED APPLICATION AND CLAIM OF PRIORITY

The present application is related to and claims priority to Korean Patent Application Nos. 10-2016-0130888 filed on Oct. 10, 2016, the contents of which are incorporated herein by reference.

TECHNICAL FIELD

The present disclosure relates to a wireless communication system, and more particularly, to a method and an apparatus for transmission and reception for a base station and a terminal.

BACKGROUND

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming using array antennas, massive MIMO, full dimension MIMO (FD-MIMO), hybrid beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FOAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched.

Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

Recently, with the development of long term evolution (LTE) and LTE-Advanced, researches for multiple timing transmission schemes have been actively made in a wireless cellular communication system. In particular, in a terminal capable of performing HARQ-ACK feedback of downlink data or transmission of uplink data in various or multiple timings, there is a need for a transmission/reception method for a base station and a terminal in accordance with a TA value and a fallback mode.

SUMMARY

To address the above-discussed deficiencies, it is a primary object to provide a system and method for performing HARQ-ACK feedback of downlink data or transmission of uplink data in various or multiple timings In order to support at least 100 km as a distance between a base station and a terminal in a wireless communication system, signal transmission should be made in the timing that is earlier than the timing determined based on the reception on the terminal side for about 0.67 ms. This is to match the reception timing of signals transmitted from several terminals, and it is called timing advance (TA).

In an LTE system in the related art having a transmission time interval of 1 ms, a terminal performs uplink data transmission (PUSCH transmission) in about 4 ms after it receives an uplink scheduling grant from a base station. Further, the terminal transmits an acknowledgement (ACK) or a negative acknowledgement (NACK) of a hybrid automatic repeat request (HARQ) for downlink data (PDSCH) as uplink control signal (PUCCH or PUSCH) also in about 4 ms after it receives the downlink data (PDSCH) from the base station.

Accordingly, in the related art, a processing time in which the terminal processes a received signal and prepares a transmitted signal may be a time obtained by excluding the timing advance from about 3 ms, and in consideration of the maximum timing advance, the minimum processing time may be about 2.33 ms. In the LTE system in the related art, the maximum TA value assumed by the terminal is about 0.67 ms. If a TA value that is larger than the maximum TA value is transferred from the base station, the terminal may re-perform processes before the data transmission and reception, such as cell selection, initial connection, and RACH.

That is, in the case where the transmission time interval (TTI) length becomes shortened or several TTI lengths exist, or the timing in which the terminal receives the uplink scheduling grant and transmit the uplink data in a given TTI length and the timing in which the terminal receives the downlink data and transmits the HARQ ACK or NACK for the downlink data to an uplink control channel can be variously determined, it may be impossible for the terminal to transmit data to the base station at a specifically determined time depending on the degree of the TA.

For example, in the case where it is intended to receive the downlink data at the n-th TTI of 1 ms and to transmit a corresponding HARQ-ACK feedback at the (n+3)-th TTI, if the TA value is too large, the processing time may be insufficiently secured, and it may be impossible for the terminal to transmit the HARQ-ACK feedback at the (n+3)-th TTI. Accordingly, with respect to the terminal having a short TTI length or the terminal that requires an early timing in which it receives an uplink scheduling grant and transmits uplink data and an early timing in which it receives downlink data and transmits a HARQ ACK or NACK for the downlink data to an uplink control channel, restrictions on the maximum TA value to be supported by the terminal would be lowered as compared with those in the related art so that the terminal can secure the processing time.

Further, as an example, even if the terminal is set to have the early timing in which it receives the uplink scheduling grant and transmits the uplink data and the early timing in which it receives the downlink data and transmits the HARQ ACK or NACK for the downlink data to the uplink control channel, the base station, in a specific situation, may request the terminal to transmit the data in the normal timing that is not earlier than the timing set in the terminal. For an operation in the normal timing as described above, a fallback mode may be defined. The specific situation may include a case where the TA value of the terminal is changed to be equal to or larger than a predetermined value.

An aspect of the present disclosure is to a method and an apparatus for transmission and reception for a base station and a terminal, which can transmit a HARQ-ACK feedback of downlink data or uplink data in multiple timings, in accordance with a TA value and a fallback mode.

In accordance with an aspect of the present disclosure, a method for a base station includes determining a transmission type of a terminal as one of a first transmission type and a second transmission type, the transmission type being related to a transmission time interval; transmitting a message including information on the determined transmission type to the terminal; and transmitting control information for the terminal in a search space determined based on the determined transmission type.

In accordance with another aspect of the present disclosure, a method for a terminal includes receiving, from a base station, a message including information on a transmission type of the terminal, the transmission type being related to a transmission time interval; and monitoring control information for the terminal in a search space determined based on the information on the transmission type included in the message.

In accordance with still another aspect of the present disclosure, a base station includes a transceiver; and at least one processor configured to control the transceiver to determine a transmission type of a terminal as one of a first transmission type and a second transmission type, the transmission type being related to a transmission time interval, to transmit a message including information on the determined transmission type to the terminal, and to transmit control information for the terminal in a search space determined based on the determined transmission type.

In accordance with yet still another aspect of the present disclosure, a terminal includes a transceiver configured to receive, from a base station, a message including information on a transmission type of the terminal, the transmission type being related to a transmission time interval; and at least one processor configured to monitor control information for the terminal in a search space determined based on the information on the transmission type included in the message.

According to the aspects of the present disclosure, by providing the transmission and reception operations of the terminal capable of transmitting the multiple timing feedback and the data and the base station, the base station and the terminal can efficiently operate to reduce a delay of a transmission time or to reduce power consumption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
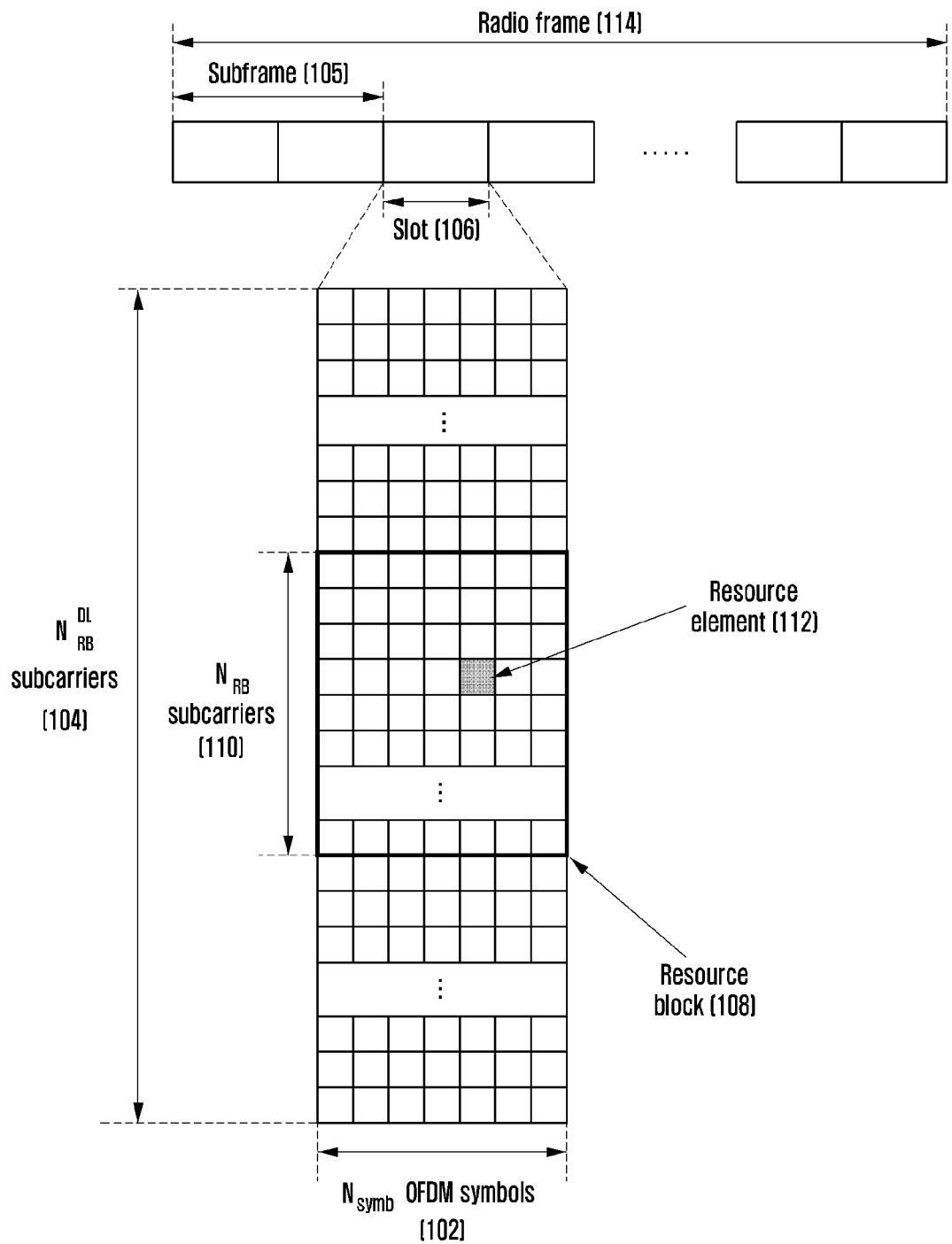
FIG. 1 illustrates a downlink time-frequency domain transmission structure of an LTE or LTE-A system in the related art.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. In describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system.

In order to achieve a high data rate, implementation of 5G communication system in a millimeter wave (mmWave) band (e.g., like 60 GHz band) has been considered. In order to mitigate a radio wave path loss and to increase a radio wave transmission distance in the mmWave band, technologies of beam-forming, massive MIMO, Full Dimension MIMO (FD-MIMO), array antenna, analog beam-forming, and large scale antenna for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, hybrid FSK and QAM modulation (FQAM) and sliding window superposition coding (SWSC), which correspond to advanced coding modulation (ACM) system, and filter bank multi carrier (FBMC), non-orthogonal multiple access (NOMA), and sparse code multiple access (SCMA), which correspond to advanced connection technology, have been developed in the 5G system.

The wireless communication system has escaped from an initial voice-oriented service providing system, and has been developed as a broadband wireless communication system that provides high-speed and high-quality packet data services in accordance with the communication standards, such as high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE. Further, for the 5G wireless communication system, 5G or new radio (NR) communication standards have been made.

In the LTE system that is a representative example of the broadband wireless communication system, an orthogonal frequency division multiplexing (OFDM) method is adapted for a downlink (DL), and a single carrier frequency division multiple access (SC-FDMA) method is adapted for an uplink (UL). The uplink means a radio link through which a terminal (user equipment (UE) or mobile station (MS)) transmits data or a control signal to a base station (BS or eNode B), and the downlink means a radio link through which the base station transmits data or a control signal to the terminal. In general, the multiple access method as described above separates data and control information from each other for each user by allocating and operating time-frequency resources on which the data or the control information is carried for each user so that the resources do not overlap each other, that is, so that the orthogonality is realized.

The LTE system adapts a hybrid automatic repeat request (HARQ) method in which a physical layer re-transmits the corresponding data if a decoding failure occurs during initial transmission. The HARQ method enables a receiver to transmit information (negative acknowledgement (NACK)) for notifying a transmitter of the decoding failure if the receiver could not accurately decode the data, so that the transmitter can re-transmit the corresponding data on the physical layer. The receiver combines the data re-transmitted by the transmitter with the previous data of which the decoding has failed to heighten data reception performance. Further, if the receiver has accurately decoded the data, it transmits information (acknowledgement (ACK)) for notifying the transmitter of a decoding success, so that the transmitter can transmit new data.

FIG. 1 illustrates the basic structure of a time-frequency domain that is a radio resource region from which the data or control channel is transmitted through a downlink in an LE system.

In FIG. 1, a horizontal axis represents a time domain, and a vertical axis represents a frequency domain. In the time domain, the minimum transmission unit is an OFDM symbol, and $N_{symb}$ OFDM symbols 102 are gathered to constitute one slot 106, and two slots are gathered to constitute one subframe 105. The length of the slot is 0.5 ms, and the length of the subframe is 0.1 ms. Further, the radio frame 114 is a time domain interval composed of 10 subframes. The minimum transmission unit in the frequency domain is a subcarrier, and the transmission bandwidth of the whole system is composed of $N_{BW}$ subcarriers 104 in total.

In the time-frequency domain, the basic unit of a resource is a resource element (RE) 112, and it may be indicated as an OFDM symbol index and a subcarrier index. A resource block (RB) 108 or a physical resource block (PRB) is defined as $N_{symb}$ successive OFDM symbols 102 in the time domain and $N_{RB}$ successive subcarriers 110 in the frequency domain. Accordingly, one RB 108 is composed of $N_{symb} \times N_{RB}$ REs 112. In general, the minimum transmission unit of data is the RB unit as described above. In the LTE system, it is general that $N_{symb}$ is $N_{symb}=7$ and $N_{RB}$ is $N_{RB}=2$, and $N_{BW}$ and $N_{RB}$ are in proportion to the system transmission bandwidth.

The data rate is increased in proportion to the number of RBs being scheduled. In the LTE system, 6 transmission bandwidths are defined and operated. In the case of a frequency division duplex (FDD) system that divides and operates a downlink and an uplink through a frequency, the transmission bandwidth of the downlink and the transmission bandwidth of the uplink may differ from each other.

The channel bandwidth indicates a radio frequency (RF) bandwidth that corresponds to the system transmission bandwidth. Table 1A presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 1A

| | CHANNEL BANDWIDTH $BW_{CHANNEL}$ [MHz] | | | | |
|---|---|---|---|---|---|
| | 1.4 | 3 | 5 | 10 | 15 | 20 |
| TRANSMISSION BANDWIDTH CONFIGURATION $N_{RB}$ | 6 | 15 | 25 | 50 | 75 | 100 |

In the case of downlink control information, it is transmitted within the first N OFDM symbols in the subframe. In general, the number N is N={1, 2, 3}. Accordingly, in accordance with the amount of control information to be transmitted in the current subframe, the value N is varied for each subframe. The control information includes a control channel transmission interval indicator indicating how many OFDM symbols the control information is transmitted through, scheduling information on downlink data or uplink data, and a HARQ ACK/NACK signal.

In the LTE system, the scheduling information on the downlink data or the uplink data is transferred from the base station to the terminal through downlink control information (DCI). The DCI defines various formats, and a determined DCI format is applied and operated depending on whether the scheduling information is uplink data scheduling information (UL grant) or downlink data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the downlink data is configured to include at least the following control information.

Resource allocation type 0/1 flag: This is to notify whether a resource allocation type is type 0 or type 1. The type 0 allocates resources in the unit of a resource block group (RBG) through applying of a bitmap type. In the LTE system, the basic unit of scheduling is the RB that is expressed as a time and frequency domain resource, and the RBG is composed of a plurality of RBs to be considered as the basic unit of scheduling in the type 0. The type 1 allocates a specific RB in the RBG.

Resource block assignment: This is to notify of the RB that is allocated for data transmission. The expressed resource is determined in accordance with the system bandwidth and the resource allocation method.

Modulation and coding scheme (MCS): This is to notify of a modulation method used for data transmission and the size of a transport block that is data to be transmitted.

HARQ process number: This is to notify of the process number of HARQ.

New data indicator: This is to notify whether HARQ transmission is initial transmission or retransmission.

Redundancy version: This is to notify of a redundancy version of HARQ.

Transmit power control (TPC) command for physical uplink control channel (PUCCH): This is to notify of a transmission power control command for a PUCCH that is an uplink control channel.

The DCI is transmitted through a physical downlink control channel (PDCCH) (or control information, hereinafter, mixedly used) that is a downlink physical control channel or an enhanced PDCCH (EPDCCH) (or enhanced control information, hereinafter, mixedly used) after passing through a channel coding and modulation process.

In general, the DCI is scrambled by a specific radio network temporary identifier (RNTI) (or terminal identifier) independently with respect to each terminal, is added with a cyclic redundancy check (CRC), is channel-coded, and then is configured as an independent PDCCH to be transmitted. In the time domain, the PDCCH is mapped and transmitted for the control channel transmission interval. The mapping location of the frequency domain of the PDCCH is determined by the identifier (ID) of each terminal, and the PDCCH is transmitted through the transmission band of the whole system.

The resource region on which the DCI that is the control signal or the PDCCH can be mapped is called a search space. The search space is a pre-engaged location between the base station and the terminal, and may be changed in accordance with time. Accordingly, the terminal performs DCI or PDCCH decoding in a pre-known search space, determines whether a DCI that is transmitted to the terminal itself exists, and performs downlink data reception, uplink data transmission, and other operations according to the DCI if the DCI that is transmitted to the terminal itself is detected.

The search space may be divided into a cell-specific search space or a common search space (CSS) and a UE-specific search space (USS). The CSS is a space in which a control signal can be transmitted to all terminals that connect to the corresponding base station, and the USS is a space in which a control signal can be transmitted to a specific terminal. As an example, a specific frequency-time resource may be a CSS and may be a USS of a specific terminal as well, or may be USSs of several terminals. That is, the CSS and the USS may partially overlap each other, and USSs of several terminals may partially overlap each other.

The downlink data is transmitted through a physical downlink shared channel (PDSCH) that is a physical channel for transmitting the downlink data. The PDSCH is transmitted after the control channel transmission interval, and scheduling information, such as a concrete mapping location or a modulation method in the frequency domain, may be included in the DCI to be transmitted through the PDCCH.

The base station notifies the terminal of the modulation method applied to the PDSCH to be transmitted to the terminal and the transport block size (TBS) through an MCS that is composed of 5 bits in the control information constituting the DCI. The TBS corresponds to the size before channel coding for error correction is applied to the transport block (TB) to be transmitted by the base station.

The modulation method supported in the LTE system is quadrature phase shift keying (QPSK), 16 quadrature amplitude modulation (16QAM), or 64QAM, and respective modulation orders correspond to 2, 4, and 6. That is, in the case of the QPSK modulation, 2 bits per symbol may be transmitted, and in the case of the 16OQAM modulation, 4 bits per symbol may be transmitted. Further, in the case of the 64QAM modulation, 6 bits per symbol may be transmitted.

Figure 2:
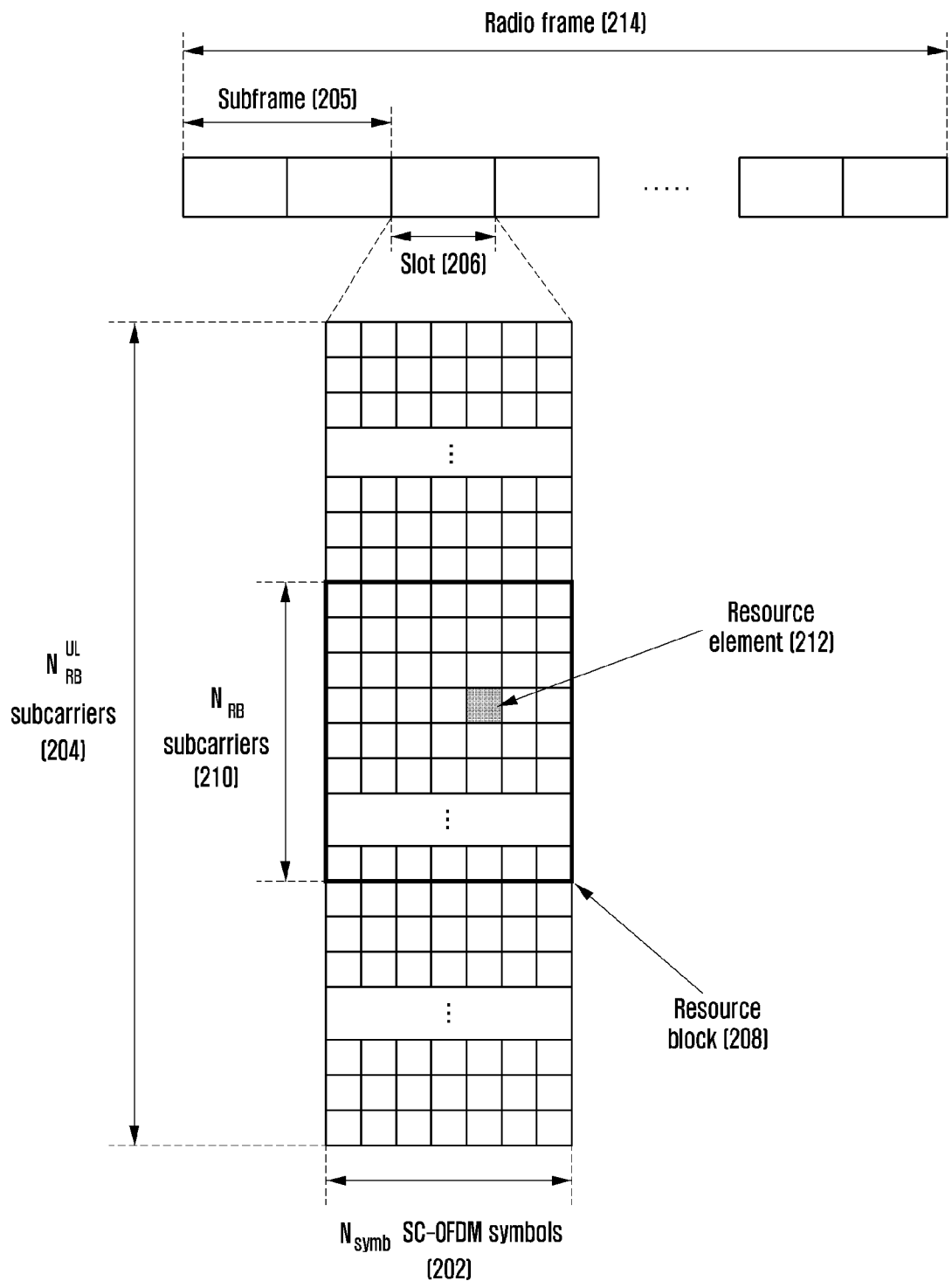
FIG. 2 illustrates an uplink time-frequency domain transmission structure of an LTE or LTE-A system in the related art.

FIG. 2 illustrates the basic structure of a time-frequency domain that is a radio resource region from which data or a control channel is transmitted through an uplink in an LTE-A system in the related art.

In FIG. 2, a horizontal axis represents a time domain, and a vertical axis represents a frequency domain. In the time domain, the minimum transmission unit in a time domain is a SC-FDMA symbol 202, and $N_{symb}^{UL}$ SC-FDMA symbols are gathered to constitute one slot 206. Further, two slots are gathered to constitute one subframe 205. The minimum transmission unit in the frequency domain is a subcarrier, and the transmission bandwidth 204 of the whole system is composed of $N_{BW}$ subcarriers in total.

In the time-frequency domain, the basic unit of a resource is a resource element (RE) 212, and the resource may be defined as an SC-FDMA symbol index and a subcarrier index. The resource block (RB) pair 208 is defined as $N_{symb}^{UL}$ successive SC-FDMA symbols in the time domain and $N_{sc}^{RB}$ successive subcarriers in the frequency domain. Accordingly, one RB is composed of $N_{symb}^{UL} \times N_{sc}^{RB}$ REs. In general, the minimum transmission unit of data or control information is the RB unit. In the case of a PUCCH, it is mapped on the frequency domain corresponding to 1 RB, and it transmitted for one subframe.

In the LTE system, the timing relationship between a PDSCH that is a physical channel for transmitting downlink data or a PDCCH/EPDDCH including a semi-persistent scheduling (SPS) release and an uplink physical channel (PUCCH or PUSCH) through which a corresponding HARQ ACK/NACK is transmitted has been defined. As an example, in the LTE system that operates as a frequency division duplex (FDD), the HARQ ACK/NACK corresponding to the PDSCH transmitted in the (n−4)-th subframe or the PDCCH/EPDDCH including the SPS release is transmitted by the PUCCH or PUSCH in the n-th subframe.

In the LTE system, a downlink HARQ adapts an asynchronous HARQ method in which data re-transmission time is not fixed. That is, if the HARQ NACK is fed back from the terminal with respect to the initially transmitted data transmitted by the base station, the base station freely determines the transmission time of re-transmitted data through the scheduling operation. The terminal buffers the data that is determined as an error as the result of decoding the received data for the HARQ operation, and then performs combining with the next re-transmitted data.

If the PDSCH including the downlink data transmitted from the base station in the subframe n is received, the terminal transmits the uplink control information including the HARQ ACK or NACK of the downlink data to the base station through the PUCCH or PUSCH in the subframe n+k. In this case, k is differently defined in accordance with the FDD or time division duplex (TDD) of the LTE system and the subframe configuration.

As an example, in the case of the FDD LTE system, k is fixed to 4. On the other hand, in the case of the TDD LTE system, k may be changed in accordance with the subframe configuration and the subframe number. Further, during data transmission through a plurality of carriers, the k value may be differently applied in accordance with the TDD configuration of each carrier. In the case of the TDD, the k value is determined in accordance with TDD UL/DL configuration as in table 1B below.

TABLE 1B

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 1B-continued

| UL-DL Configuration | \multicolumn{10}{c}{Subframe n} |
| --- | --- | --- | --- | --- | --- | --- | --- | --- | --- | --- |
|  | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, in contrast with the downlink HARQ, the uplink HARQ adapts a synchronous HARQ method in which the data transmission time is fixed. That is, the uplink/downlink timing relationship among a physical uplink shared channel (PUSCH) that is a physical channel for transmitting the uplink data, a PDCCH that is a preceding downlink control channel, and a physical hybrid indicator channel (PHICH) that is a physical channel through which the downlink HARQ ACK/NACK corresponding to the PUSCH is transmitted is fixed by the following rule.

If the PDCCH including the uplink scheduling control information transmitted from the base station in the subframe n or the PHICH through which the downlink HARQ ACK/NACK is transmitted is received, the terminal transmits the uplink data corresponding to the control information through the PUSCH in the subframe n+k. In this case, k is differently defined in accordance with the FDD or TDD of the LTE system and its configuration. As an example, in the case of the FDD LTE system, k is fixed to 4. On the other hand, in the case of the TDD LTE system, k may be changed in accordance with the subframe configuration and the subframe number.

Further, if the terminal receives the PHICH that carries the downlink HARQ ACK/NACK from the base station in the subframe i, the PHICH corresponds to the PUSCH transmitted by the terminal in the subframe i-k. In this case, k is differently defined in accordance with the FDD or TDD of the LTE system and its configuration. As an example, in the case of the FDD LTE system, k is fixed to 4. On the other hand, in the case of the TDD LTE system, k may be changed in accordance with the subframe configuration and the subframe number. Further, during data transmission through a plurality of carriers, the k value may be differently applied in accordance with the TDD configuration of each carrier. In the case of the TDD, the k value is determined in accordance with TDD UL/DL configuration as in table 1C below.

TABLE 1C

| TDD UL/DL Configuration | \multicolumn{10}{c}{subframe index n} |
| --- | --- | --- | --- | --- | --- | --- | --- | --- | --- | --- |
|  | 0 | 1 | 2 | 3 | 4 | 5 | 6 | 7 | 8 | 9 |
| 0 | 4 | 6 |  |  |  | 4 | 6 |  |  |  |
| 1 |  | 6 |  |  | 4 |  | 6 |  |  | 4 |
| 2 |  |  |  | 4 |  |  |  |  | 4 |  |
| 3 | 4 |  |  |  |  |  |  |  | 4 | 4 |
| 4 |  |  |  |  |  |  |  |  | 4 | 4 |
| 5 |  |  |  |  |  |  |  |  | 4 |  |
| 6 | 7 | 7 |  |  |  | 7 | 7 |  |  | 5 |

On the other hand, the HARQ-ACK information of the PHICH that is transmitted in the subframe i is related to the PUSCH that is transmitted in the subframe i-k. In the FDD system, k is given as 4. That is, in the FDD system, the HARQ-ACK information of the PHICH that is transmitted in the subframe i is related to the PUSCH that is transmitted in the subframe i-k. In the FDD system, if only one serving cell is configured or a plurality of cells having the same TDD UL/DL configuration are configured with respect to the terminal in which enhanced interference management and traffic adaptation (EIMTA) is not configured, the k value may be given in accordance with table 1D below in the case where the k value is 6 in TDD UL/DL setup 1.

TABLE 1D

| TDD UL/DL Configuration | \multicolumn{10}{c}{subframe number n} |
| --- | --- | --- | --- | --- | --- | --- | --- | --- | --- | --- |
|  | 0 | 1 | 2 | 3 | 4 | 5 | 6 | 7 | 8 | 9 |
| 0 | 7 | 4 |  |  |  | 7 | 4 |  |  |  |
| 1 |  | 4 |  |  | 6 |  | 4 |  |  | 6 |
| 2 |  |  |  | 6 |  |  |  |  | 6 |  |
| 3 | 6 |  |  |  |  |  |  |  | 6 | 6 |
| 4 |  |  |  |  |  |  |  |  | 6 | 6 |
| 5 |  |  |  |  |  |  |  |  | 6 |  |
| 6 | 6 | 4 |  |  |  |  | 7 | 4 |  | 6 |

That is, for example, in the TDD UL/DL setup 1, the PHICH transmitted in the subframe 6 may be HARQ-ACK information of the PUSCH transmitted in the subframe 2 that is earlier than the subframe 6 for 4 subframes.

If the HARQ-ACK is received in the PHICH resource corresponding to $I_{PHICH}=0$ in TDD UL/DL setup 0, the PUSCH indicated by the HARQ-ACK information is the PUSCH that is transmitted in the subframe i-k, and the k value is given in accordance with table 1D as above. If the HARQ-ACK is received in the PHICH resource corresponding to $I_{PHICH}=1$ in the TDD UL/DL setup 0, the PUSCH indicated by the HARQ-ACK information is the PUSCH that is transmitted in the subframe i-6.

Figure 3:
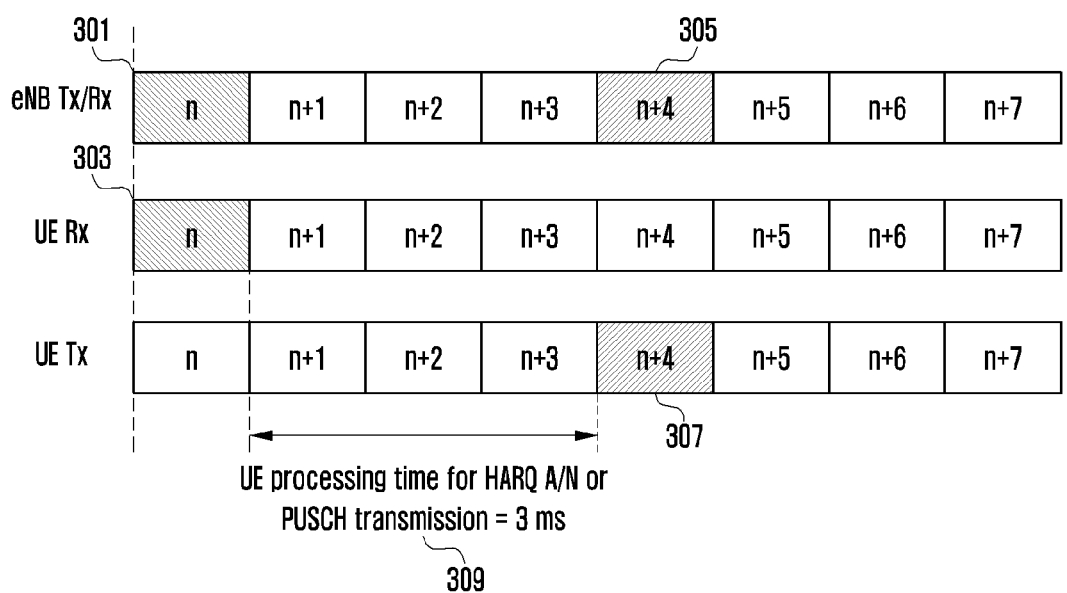
FIG. 3 illustrates the first and second signal transmission/reception timings of a base station and a terminal if a transfer delay time is 0 in an LTE or LTE-A system in the related art.

FIG. 3 illustrates the timing of a base station and a terminal in a FDD LTE system if uplink scheduling is granted and uplink data is transmitted or if downlink data is received and HARQ ACK or NACK is transferred.

If the base station transmits an uplink scheduling grant or a downlink control signal and data to a terminal in the subframe n 301, the terminal receives the uplink scheduling grant or the downlink control signal and the data in the subframe n 303.

First, as an example, in the case of receiving the uplink scheduling grant in the subframe n 303, the terminal transmits uplink data in the subframe n+4 307. Further, in the case of receiving the downlink control signal and the data in the subframe n 303, the terminal transmits the HARQ ACK or NACK for the downlink data in the subframe n+4 307.

Accordingly, the processing time in which the terminal receives the uplink scheduling grant and transmits the uplink data or the terminal receives the downlink data and transfers the HARQ ACK or NACK becomes 3 ms corresponding to three subframes (309).

On the other hand, since the terminal is generally located far apart from the base station, a signal transmitted by the terminal is received in the base station after a propagation delay time elapses. The propagation delay time may be considered as a value obtained by dividing a path in which radio waves propagate from the terminal to the base station by the speed of light, and in general, it may be considered as a value obtained by dividing a distance from the terminal to the base station by the speed of light.

As an example, if the terminal is located 100 km apart from the base station, a signal transmitted by the terminal is received in the base station after about 0.34 ms. In contrast, a signal transmitted by the base station is received in the terminal after about 0.34 ms.

As described above, the time in which the signal transmitted by the terminal is received in the base station may differ depending on the distance between the terminal and the base station. Accordingly, if several terminals existing in different locations simultaneously transmit signals to the base station, times in which the base station receives the signals may differ from each other.

This problem can be solved by slightly changing the signal transmission times of the terminals in accordance with the locations of the terminals so that the signals transmitted from the several terminals are simultaneously received in the base station. Here, information related to the slight changes of the signal transmission times of the respective terminals may be called timing advance (TA) information in the LTE system.

In the LTE system, the terminal transmits a random access channel (RACH) signal or a preamble to the base station in order to perform a random access (RA), and the base station calculates the timing advance values required for uplink synchronization of the terminals and transfers the resultant timing advance value of 11 bits to the terminal through a random access response.

Then, the terminal matches uplink synchronization using the transferred timing advance value. Thereafter, the base station continuously measures the timing advance value that is additionally required by the terminal for the uplink synchronization of the terminal to transfer the measured value to the terminal. The additional timing advance value is composed of 6 bits, and is transferred through a MAC control element (CE). The terminal adjusts the timing advance value by adding the transferred additional timing advance value of 6 bits to the timing advance value that has already been applied.

Figure 4:
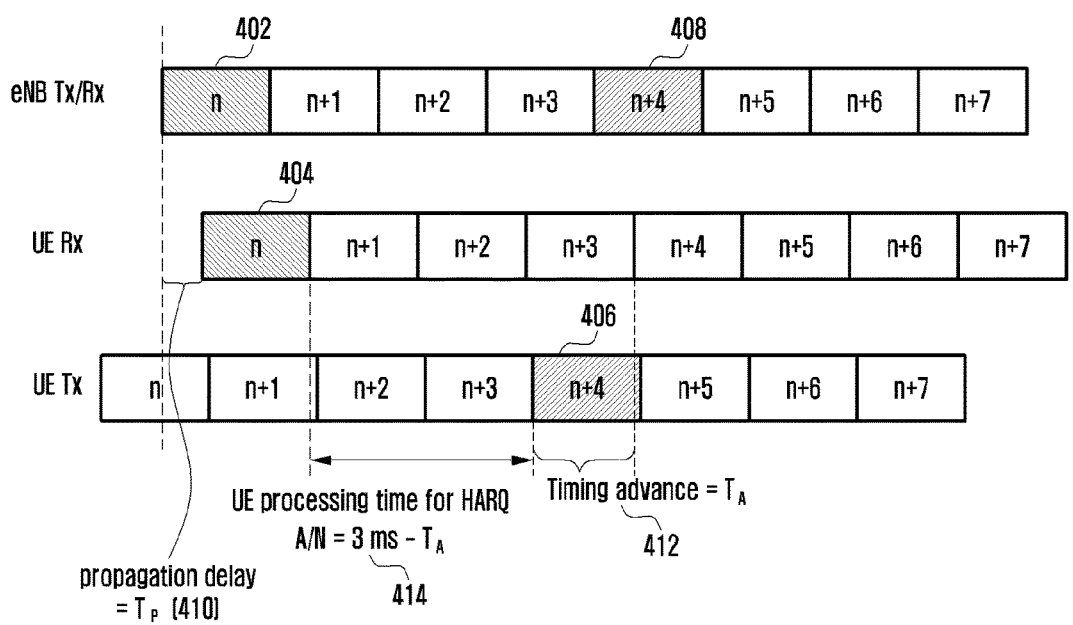
FIG. 4 illustrates the first and second signal transmission/reception timings of a base station and a terminal if a transfer delay time is longer than 0 and a timing advance is applied in an LTE or LTE-A system in the related art.

FIG. 4 illustrates the timing relationship in accordance with the timing advance according to a distance between a terminal and a base station in a FDD LTE system if the terminal receives an uplink scheduling grant and transmits uplink data or if the terminal receives downlink data and transfers HARQ ACK or NACK.

If the base station transmits the uplink scheduling grant or a downlink control signal and data to the terminal in the subframe n 402, the terminal receives the uplink scheduling grant or the downlink control signal and the data in the subframe n 404. In this case, the terminal receives the uplink scheduling grant or the downlink control signal later than the time when the signal is transmitted by the base station for a propagation delay time $T_P$ 410.

First, as an example, in the case of receiving the uplink scheduling grant in the subframe n 404, the terminal transmits uplink data in the subframe n+4 406. Further, in the case of receiving the downlink control signal and the data in the subframe n 404, the terminal transmits the HARQ ACK or NACK for the downlink data in the subframe n+4 406.

Even in the case of transmitting the signal to the base station, the terminal transmits the HARQ ACK/NACK for the uplink data or the downlink data in the timing 406 that is earlier than the subframe n+4 based on the signal received by the terminal for $T_A$ 412 so that the signal is received in the base station at a specific time.

Accordingly, the processing time in which the terminal receives the uplink scheduling grant and transmits the uplink data or the terminal receives the downlink data and transfers the HARQ ACK or NACK becomes a time obtained by excluding the $T_A$ from 3 ms corresponding to three subframes (414). The time (3 ms-$T_A$) is based on the LTE system in the related art having TTI of 1 ms, and in the case where the TTI length is shortened and the transmission timing is changed, the time (3 ms-$T_A$) may be changed to another value.

The base station calculates an absolute value of the TA of the corresponding terminal. When the terminal performs an initial access, the base station may calculate the absolute value of the TA by adding/subtracting a variation of the TA value transferred through higher layer signaling to/from the TA value firstly transferred to the terminal at the random access operation. In the present disclosure, the absolute value of the TA may be a value obtained by subtracting a start time of the n-th TTI received by the terminal from a start time of the n-th TTI transmitted by the terminal.

On the other hand, one of important performance bases of a wireless cellular communication system is packet data latency. For this, in the LTE system, signal transmission/reception is performed in the unit of a subframe having a transmission time interval (TTI) of 1 ms. The LTE system operating as described above may support the terminal (short-TTI UE) having a transmission time interval that is shorter than 1 ms.

In an NR that is the 5G mobile communication system, the transmission time interval may be shorter than 1 ms. It is expected that the short-TTI UE is suitable to a voice over LTE (VoLTE) service in which the latency is important) or a service such as remote control. Further, the short-TTI UE is expected as means for realizing cellular-based mission-critical Internet of things (IoT).

Figure 5:
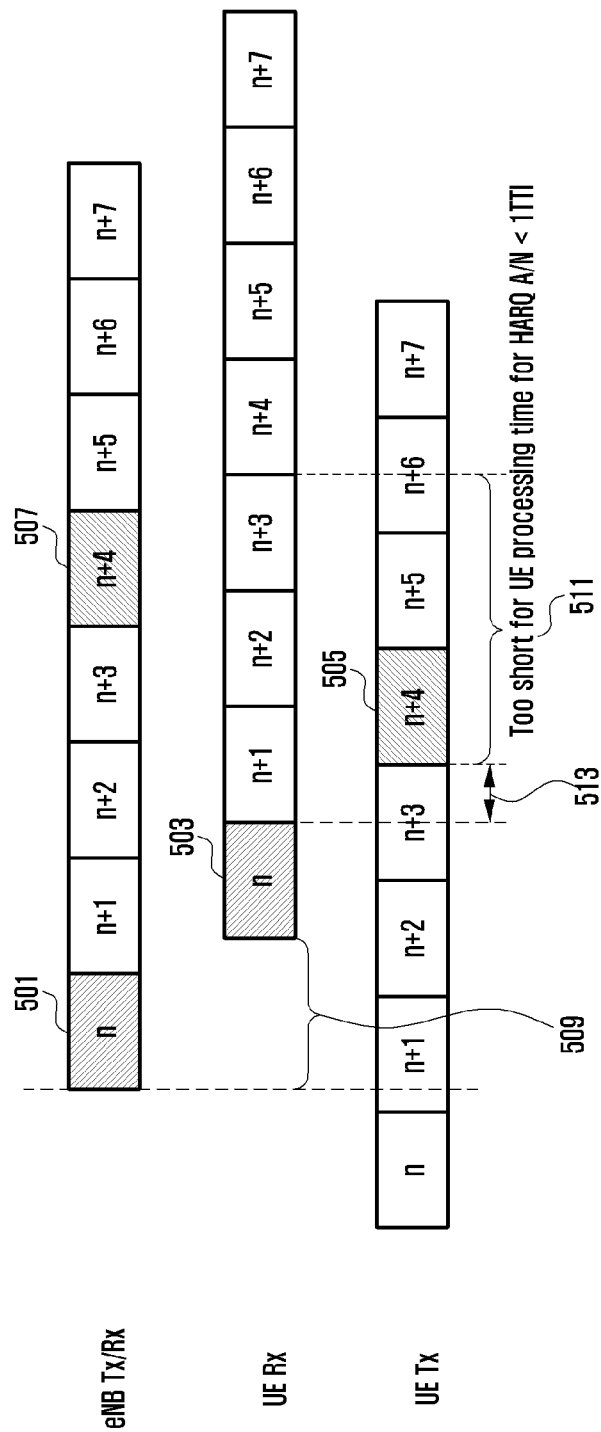
FIG. 5 illustrates the first signal and second signal transmission/reception timings of a base station and a terminal if a transfer delay time is longer than 0 and a timing advance is applied in an LTE or LTE-A system in the related art.

The processing time (3 ms-$T_A$) in which the terminal processes a transmitted signal may be changed as in FIG. 5 in the case of the short-TTI UE or in the case of the terminal having a large absolute value 511 of the $T_A$. For example, if the uplink scheduling grant is transmitted at the n-th TTI 501 and 503, and the corresponding uplink data is transmitted at the (n+4)-th TTI 505 and 507, (3TTIs-$T_A$) 513 may be the processing time of the terminal. If the TTI length is shorter than 1 ms, and the distance between the terminal and the base station is long to cause the $T_A$ to be large, the processing time (3TTIs-$T_A$) 513 of the terminal may become smaller or even may become a negative number.

In order to solve this problem, the maximum TA value assumed by the terminal for the short-TTI operation may be separately determined. The maximum TA value for the short-TTI operation is smaller than the maximum TA value in the LTE system in the related art, and may be a value that is optionally assumed to determine the terminal support capability without being determined between the base station and the terminal. Accordingly, there is a need for a method in which the terminal supporting the short-TTI operation operates in the case where the TA that exceeds the maximum TA value for the short-TTI operation and a method in which the terminal transfers to the base station information on whether the short-TTI operation is possible.

Further, in the NR system, supported services may be divided into categories, such as enhanced mobile broadband (eMBB), massive machine type communications (mMTC), and ultra-reliable and low-latency communications (URLLC). The eMBB may be a service that takes aim at high-speed transmission of high-capacity data, the mMTC may be a service that takes aim at terminal power minimization and plural terminal connection, and the URLLC may be a service that takes aim at high reliability and low latency.

In this case, different requirements may be applied in accordance with the kind of services applied to the terminal. For example, in accordance with the kind of services, different operations may be performed within a predetermined processing time, and in the case of a service supporting the URLLC, it may be important to perform a determined operation in a short time since low latency is important. As described above, in accordance with the kind of services given to the terminal, restrictions on the TA values required by the terminal may differ. That is, it may be specified that the terminal assumes different maximum TA values for respective services, or the terminal may assume the same maximum TA value even if the services are different from each other.

Hereinafter, embodiments of the present disclosure will be described in detail with reference to the accompanying drawings. In describing the present disclosure, a detailed description of related functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

Hereinafter, the base station is the subject that performs resource allocation to the terminal, and may be at least one of an eNode B, Node B, base station (BS), radio access unit, base station controller, and node on a network. The terminal may include user equipment (UE), mobile station (MS), cellular phone, smart phone, computer, or multimedia system that can perform a communication function.

In the present disclosure, a downlink (DL) is a radio transmission path of a signal that is transmitted from the base station to the terminal, and an uplink (UL) means a radio transmission path of a signal that is transmitted from the terminal to the base station. Further, although an LTE or LTE-A system is hereinafter exemplified in explaining an embodiment of the present disclosure, the embodiment of the present disclosure may be applied to even other communication systems having similar technical backgrounds or channel types. For example, the 5G mobile communication technology (5G or new radio (NR)) developed after LTE-A may be included therein. Further, the embodiment of the present disclosure may also be applied to other communication systems through partial modifications thereof in a range that does not greatly deviate from the scope of the present disclosure through the judgment of those skilled in the art.

Hereinafter, unless specially mentioned, a shortened-TTI terminal to be described may be called a first type terminal, and a normal-TTI terminal may be called a second type terminal. The first type terminal may include control information, data, or a terminal capable of transmitting the control information and the data at a transmission time interval of 1 ms or shorter than 1 ms, and the second type terminal may include control information, data, or a terminal capable of transmitting the control information and the data at a transmission time interval of 1 ms.

Hereinafter, the shortened-TTI terminal and the first type terminal are mixedly used, and the normal-TTI terminal and the second type terminal are mixedly used. Further, in the present disclosure, shortened-TTI, shorter-TTI, shortened TTI, shorter TTI, short TTI, and sTTI have the same meaning, and may be mixedly used. Further, in the present disclosure, normal-TTI, normal TTI, subframe TTI, and legacy TTI have the same meaning, and may be mixedly used.

Hereinafter, a shortened-TTI transmission may be called a first type transmission, and a normal-TTI transmission may be called a second type transmission. The first type transmission is a method in which a control signal, a data signal, or both the control signal and the data signal are transmitted in an interval that is shorter than 1 ms, and the second type transmission is a method in which the control signal, the data signal, or both the control signal and the data signal are transmitted in an interval of 1 ms.

Hereinafter, the shortened-TTI transmission and the first type transmission are mixedly used, and the normal-TTI transmission and the second type transmission are mixedly used. The first type terminal may support both the first type transmission and the second type transmission, or may support only the first type transmission. The second type terminal supports the second type transmission, but is unable to support the first type transmission.

In the present disclosure, for convenience, "for the first type terminal" may be interpreted as "for first type transmission". If the normal-TTI and a longer-TTI exist instead of the shortened-TTI and the normal-TTI, the normal-TTI transmission may be called the first type transmission, and the longer-TTI transmission may be called the second type transmission. In the present disclosure, a first type reception and a second type reception may be processes of receiving a signal transmitted in accordance with the first type and a signal transmitted in accordance with the second type.

The first type transmission has the same TTI length as that of the normal-TTI in the related art, but may be the transmission method in which the uplink transmission after receiving the uplink scheduling or the HARQ ACK/NACK transmission in accordance with the downlink data transmission can be faster than the normal-TTI transmission in the related art. For example, in the case of 1 ms TTI in the FDD LTE system, the HARQ ACK/NACK information of the PDSCH transmitted in the subframe n is transferred to the PUCCH or PUSCH in the (n+4)-th subframe, and such an operation may be called a normal mode.

However, although the same TTI of 1 ms is used in the first type transmission, the HARQ ACK/NACK information of the PDSCH transmitted in the subframe n may be transferred to the PUCCH or PUSCH in the (n+2)-th or (n+3)-th subframe, and such an operation may be called a latency reduction mode. The latency reduction mode also includes a transmission/reception method for transmission at the shortened-TTI. That is, the first type transmission may mean at least one of a transmission method using the shortened-TTI and a transmission method in which the normal-TTI having the TTI length of 1 ms is used and the HARQ ACK/NACK information of the PDSCH transmitted in the subframe n is transferred to the PUCCH or PUSCH in the (n+2)-th or (n+3)-th subframe.

The second type transmission may indicate a transmission method in which the normal-TTI having the TTI length of 1 ms is used and the HARQ ACK/NACK information of the PDSCH transmitted in the subframe n is transferred to the PUCCH or PUSCH in the (n+4)-th or subsequent subframe. That is, in performing the uplink transmission that is performed after receiving the uplink scheduling or the HARQ ACK/NACK transmission that follows the downlink data transmission, the first type transmission is faster than the second type transmission. As described above, the first type transmission and the second type transmission may be determined in accordance with the transmission timing regardless of the TTI length.

In the present disclosure, the transmission time interval in the downlink may mean a unit in which a control signal and a data signal are transmitted or a unit in which the data signal is transmitted. For example, in the downlink of the LTE system in the related art, the transmission time interval becomes a subframe that is a time unit of 1 ms. On the other hand, in the present disclosure, the transmission time interval in the uplink may mean a unit in which the control signal and the data signal are transmitted or a unit in which the data signal is transmitted. In the uplink in the LTE system in the related art, the transmission time interval is a subframe that is a time unit of 1 ms and is the same as that in the downlink.

Further, in the present disclosure, the shortened-TTI mode corresponds to a case where the terminal or the base station transmits and receives a control signal or a data signal in the unit of a shortened TTI, and the normal-TTI mode corresponds to a case where the terminal or the base station transmits and receives the control signal or the data signal in the unit of a subframe.

Further, in the present disclosure, the shortened-TTI data means data transmitted from the PDSCH or PUSCH that is transmitted and received in the unit of a shortened TTI, and the normal-TTI data means data transmitted from the PDSCH or PUSCH that is transmitted and received in the unit of a subframe.

In the description, the control signal for the shortened-TTI means a control signal for the shortened-TTI mode operation, and hereinafter is defined as sPDCCH. Further, the control signal for the normal-TTI means a control signal for the normal-TTI mode operation. As an example, the control signal for the normal-TTI may be a physical control format indicator channel (PCFICH), physical hybrid-ARQ indicator channel (PHICH), physical downlink control channel (PDCCH), enhanced PDCCH (EPDCCH), or physical uplink control channel (PUCCH) in the LTE system in the related art.

In the description, the terms "physical channel" and "signal" in the LTE or LTE-A system in the related art are mixedly used with data or a control signal. For example, although the PDSCH is a physical channel through which the normal-TTI data is transmitted, it may be normal-TTI data in the present disclosure. As another example, although the sPDSCH is a physical channel through which the shortened-TTI data is transmitted, it may be shortened-TTI data in the present disclosure. Similarly, in the present disclosure, the shortened-TTI data transmitted in the downlink and the uplink may be called sPDSCH and sPUSCH.

Hereinafter, in the present disclosure, an uplink scheduling grant signal and a downlink data signal are called a first signal. Further, in the present disclosure, an uplink data signal for the uplink scheduling grant and the HARQ ACK/NACK for the downlink data signal are called a second signal. In the present disclosure, a signal that expects a response from the terminal among signals that the base station transmits to the terminal may be the first signal, and the response signal of the terminal corresponding to the first signal may be the second signal. Further, in the present disclosure, the service kinds of the first signal and the second signal may belong to categories, such as enhanced mobile broadband (eMBB), massive machine type communications (mMTC), and ultra-reliable and low-latency communications (URLLC).

Accordingly, in the relationship between the first type transmission and the second type transmission, the timing in which the second signal that follows the first signal is transmitted may be determined so that the first type transmission is faster than the second type transmission.

In the present disclosure, the TTI length of the first signal means the time length in which the first signal is transmitted. Further, in the present disclosure, the TTI length of the second signal means the time length in which the second signal is transmitted. Further, in the present disclosure, the transmission timing of the second signal may mean information on when the terminal transmits the second signal and when the base station receives the second signal, and may be mentioned as the transmission/reception timing of the second signal.

Figure 6:
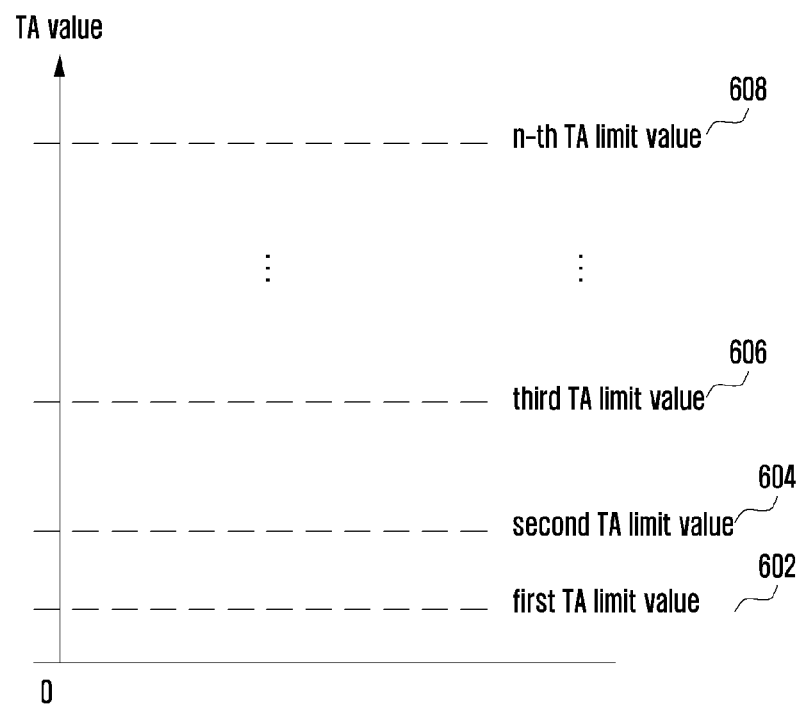
FIG. 6 illustrates a setup of TA limit values for discriminating TA values of a terminal.

Further, in the present disclosure, as shown in FIG. 6, specified TA values may be called a first TA limit value 602, a second TA limit value 604, a third TA limit value 606, and the n-th TA limit value. If the n is 1, the first TA limit value becomes a unique specific TA value, and this may be a value corresponding to about 0.67 ms that is defined as the maximum TA value in the LTE system in the related art.

Unlike this, only the first TA limit value and the second TA limit value may be defined, and in this case, the second TA limit value may be a value corresponding to about 0.67 ms that is defined as the maximum TA value in the LTE system in the related art, and the first TA limit value may be determined as a certain value that is shorter than about 0.67 ms, for example, 0.33 ms. In the present disclosure, it is assumed that as m becomes larger, the m-th TA limit value becomes larger. However, the TA limit values may be defined in an ascending order or in a descending order, and the present disclosure could be applied even in the case of no order.

As described above, the present disclosure proposes an operation method and a transmission/reception method following an higher layer signaling setup when the first type terminal receives the first type transmission or the second type transmission from the base station. In the present disclosure, it is exemplified that both the first type transmission and the second type transmission use the normal-TTI, but even in the case of different TTI lengths, the present disclosure can be applied.

In the present disclosure, in the case where the TDD system is not mentioned, it is assumed that the communication system is the FDD system. However, the method and apparatus according to an embodiment of the present disclosure in the FDD system could be applied even to the TDD system through simple modification thereof.

Hereinafter, in the present disclosure, a higher layer signaling is a method for transferring a signal from the base station to the terminal using the downlink data channel of the physical layer or a method for transferring a signal from the terminal to the base station using the uplink data channel of the physical layer, and it may be mentioned as a radio resource control (RRC) signaling or a MAC control element (CE).

Hereinafter, in the present disclosure, the terminal may mean the first type terminal unless separately mentioned. However, it will be apparent whether the terminal is the first type terminal or the second type terminal in accordance with front and behind contexts.

Hereinafter, according to various embodiments, an operation method that follows multiple timing transmission in the transmission/reception of the terminal and the base station will be described.

The first embodiment relates to an example in which the order of blind decoding (BD) of the terminal of the USS/CSS is changed in accordance with the configuration.

More specifically, a control signal from the base station may be transmitted in a search space as described above. The terminal may detect the control signal in a cell-specific search space (or a common search space (CSS)) and a UE-specific search space (USS). For example, detection of the control signal may mean decoding of a physical control channel to detect the control signal, or attempt to decode the physical control channel.

In the case where the terminal detects the control signal in the search space, it may exert an influence on power consumption of the terminal which of the search spaces CSS and USS the control signal detection is first performed with respect to.

In relation to this, in the first embodiment, a method for a terminal to determine the control signal decoding order or a control signal format to be decoded in accordance with the transmission timing of a second signal configured by a base station will be described with reference to FIGS. 7 to 10.

Figure 7:
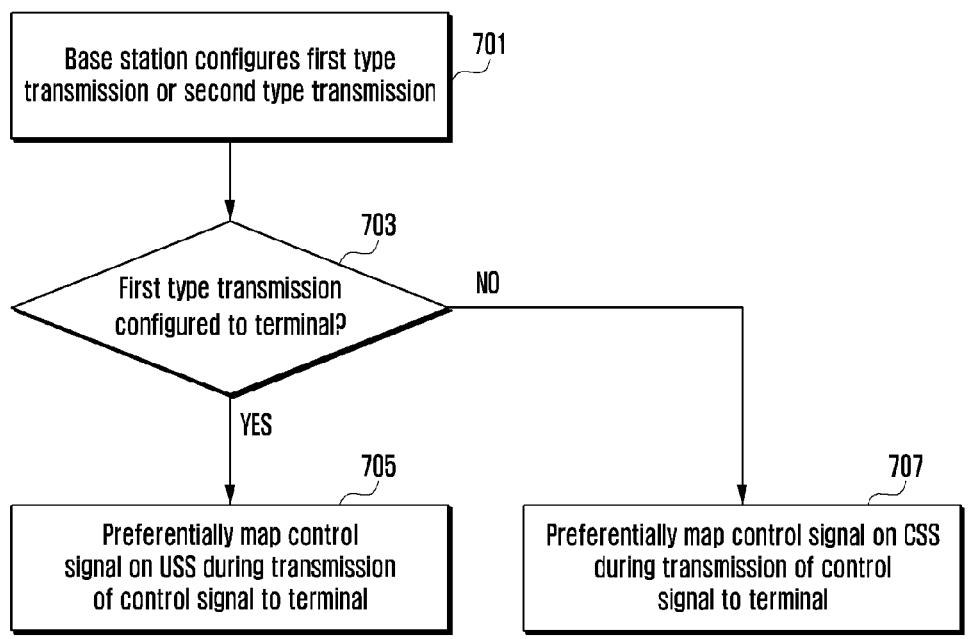
FIG. 7 illustrates a procedure of a terminal according to a first embodiment of the present disclosure.
Figure 8:
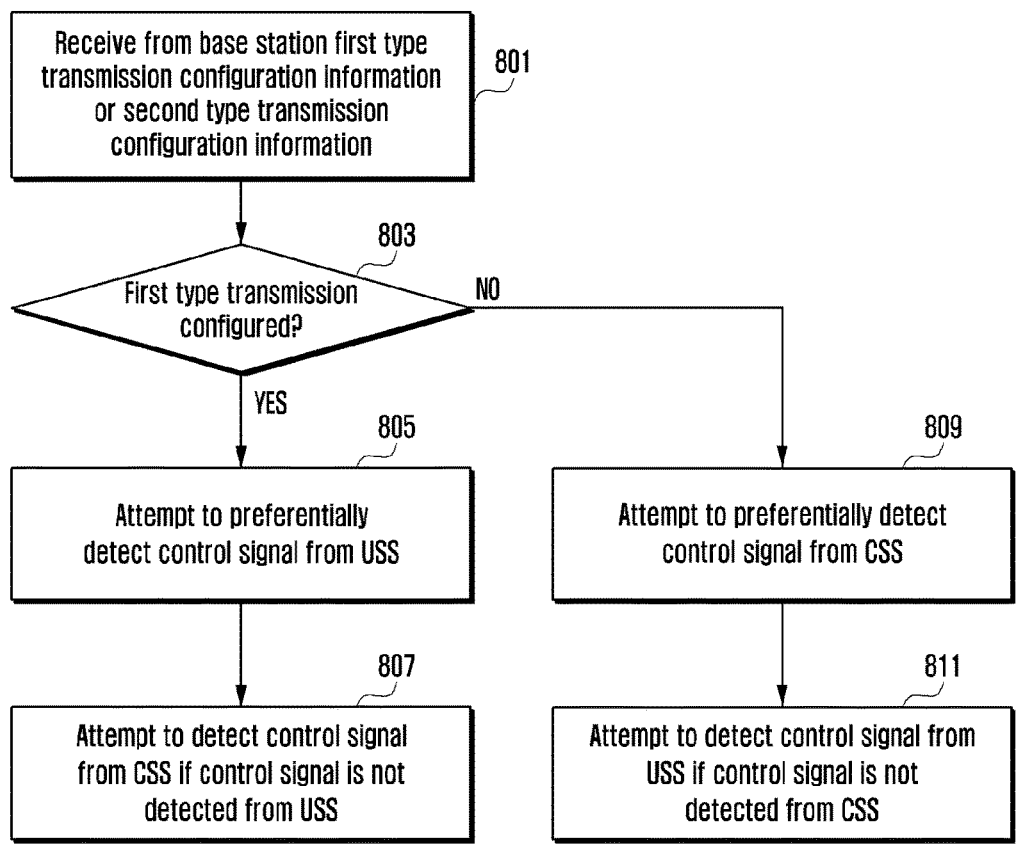
FIG. 8 illustrates a procedure of a base station according to a first embodiment of the present disclosure.
Figure 9:
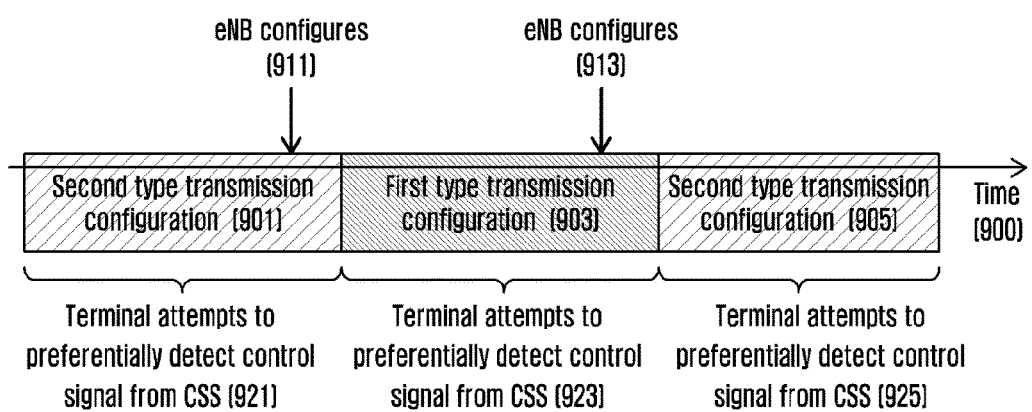
FIG. 9 illustrates a procedure of a terminal and a base station according to a first embodiment of the present disclosure.

FIG. 7 illustrates a terminal procedure according to a first embodiment of the present disclosure, and FIG. 8 is a flowchart illustrating a method for mapping a control signal in accordance with the first or second type transmission configuration of a base station. FIG. 9 is a flowchart illustrating a method for a terminal to detect a control signal in accordance with the first or second type transmission configuration from a base station.

Referring to FIG. 7, with respect to the first type terminal, the base station configures whether signals to be scheduled correspond to the first type transmission or the second type transmission through higher layer signaling (701).

The base station determines whether the transmission type configuration corresponds to the first type transmission (703), and if the first type transmission is configured, it preferentially performs mapping of the control signal to the terminal on a USS (705).

If it is determined that the transmission is not the first type transmission, the base station preferentially performs mapping of the control signal to the terminal on a CSS (707).

Referring to FIG. 8, the terminal determines in what search space it performs detection of the control signal that can be transmitted from the base station in accordance with the base station configuration (801). For example, if the first type transmission is configured, the terminal according to an embodiment of the present disclosure first detects the control signal from the USS (805), and if the control signal is not detected from the USS, it performs detection of the control signal from the CSS (807). In this case, even if the control signal is detected from the USS, the terminal may additionally detect the control signal from the CSS. Further, if the second type transmission is configured, the terminal first detects the control signal from the CSS (809), and then it detects the control signal from the USS (811).

FIG. 9 illustrates an example in which the operation method of the terminal according to the transmission type configuration is changed in accordance with the time. With the lapse of time (900), the base station may change the configuration of the first type transmission and the second type transmission with respect to the corresponding terminal (901, 903, and 905) through higher layer signaling 911 and 913. In accordance with the above-described configuration, the terminal can determine in what search space it preferentially detects the control signal or only in a certain search space it attempts to detect the control signal (921, 923, and 925).

As another example, the base station configures whether the signals to be scheduled correspond to the first type transmission or the second type transmission with respect to the terminal. In accordance with the above-described configuration, the terminal may determine in what search space it detects the format of the control signal that can be transmitted from the base station. Here, the format of the control signal may mean the type of the control signal or the size or the bit number of the control signal. For example, if the first type transmission is configured, it may detect the format of the control signal for the uplink scheduling including the HARQ process ID and NDI, whereas if the second type transmission is configured, it may detect the format of the control signal for the uplink scheduling that does not include the HARQ process ID or NDI.

The second embodiment is related to an example in which a BD method of the terminal is changed in accordance with TA. As described above, the control signal from the base station may be transmitted in a certain search space. Accordingly, the terminal may detect the control signal in the common search space and the terminal-specific search space (USS). In detecting the control signal in the search space, it may exert an influence on power consumption of the terminal to determine in what search space the terminal first detects the control signal. Accordingly, in the second embodiment, a method for the terminal to determine the decoding order of the control signal in accordance with a timing advance (TA) value applied by the terminal will be described with reference to FIG. 10.

Figure 10:
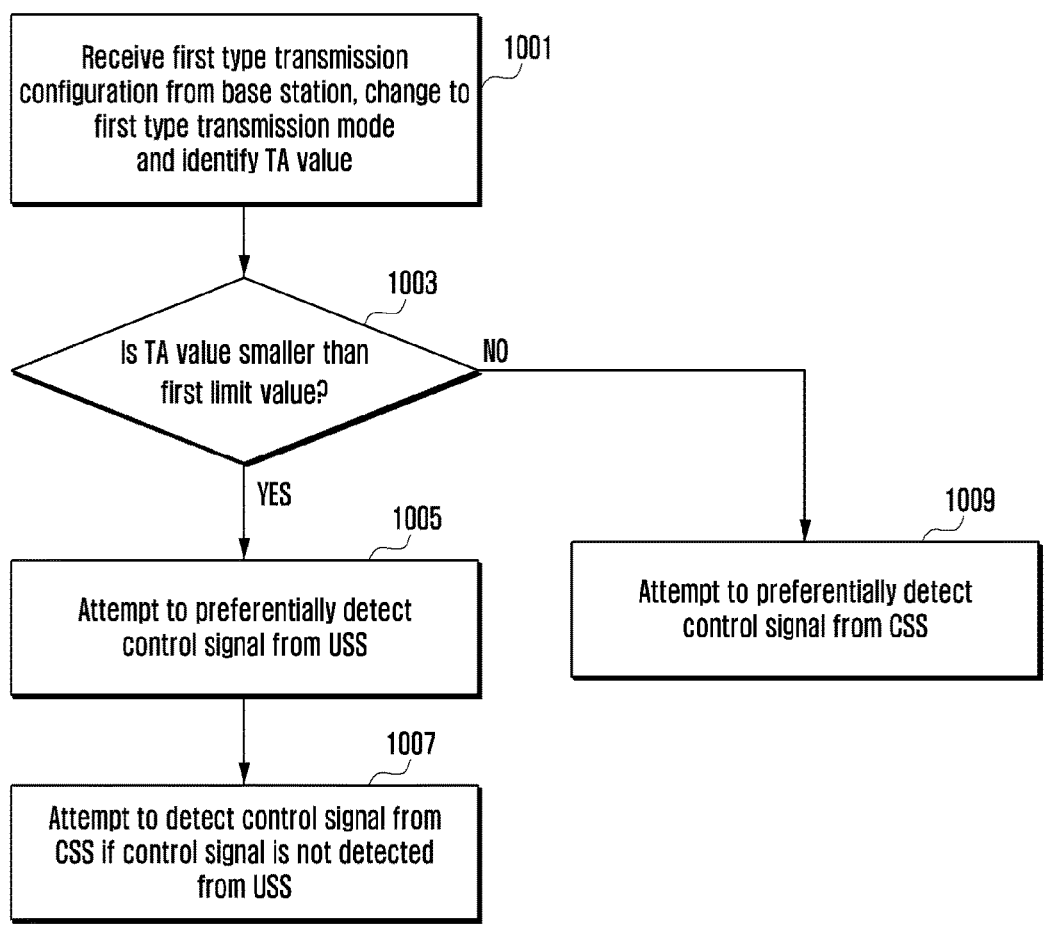
FIG. 10 illustrates a procedure of a terminal according to a second embodiment of the present disclosure.
Figure 11:
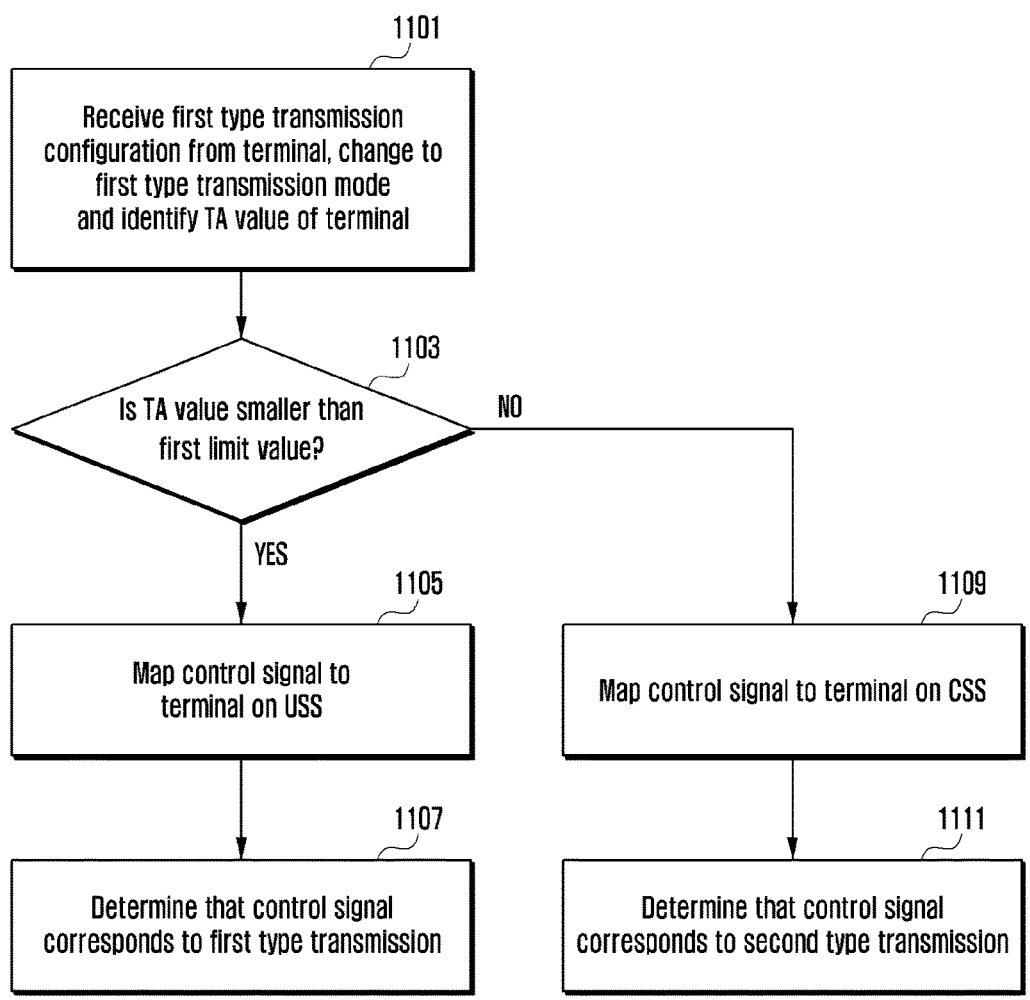
FIG. 11 illustrates a procedure of a base station according to a second embodiment of the present disclosure.

FIG. 10 illustrates an example in which a terminal determines a method for detecting a control signal in accordance with a timing advance when the terminal is configured as a first type.

The base station configures whether the signals to be scheduled correspond to the first type transmission or the second type transmission with respect to the first type terminal through higher layer signaling (1001). If the configuration corresponds to the first type transmission, the terminal determines in what search space it detects the control signal that can be transmitted from the base station in accordance with the timing advance value (1003).

For example, if the timing advance value of the terminal is smaller than the first TA limit value in a state where the terminal is configured as the first type transmission, the terminal first detects the control signal from a USS (1005), and if the control signal is not detected from the USS, the terminal then detects the control signal from a CSS (1007). Even if the control signal is detected from the USS, the terminal may additionally detect the control signal from the CSS.

Further, if the timing advance value of the terminal is larger than the first TA limit value in a state where the terminal is configured as the first type transmission, the terminal first detects the control signal from the CSS (1009). After attempting detection of the control signal at operation 1009, the terminal may complete the detection operation. In contrast with this, after operation 1009, the terminal may detect the control signal from the USS.

If it is determined that the timing advance value is larger than the first TA limit value in a state where the terminal is configured as the first type transmission, and the control signal is detected from one search space, for example, the CSS, the terminal may determine that the transmission corresponding to the control signal is the second type transmission even if the terminal is configured as the first type transmission.

The third embodiment is related to an example in which scheduling of the base station is differently performed in accordance with TA. In the third embodiment, a method for determining whether the base station schedules the base station as the first type transmission or as the second type transmission will be described with reference to FIG. 11.

With respect to the first type terminal, the base station configures whether signals to be scheduled correspond to the first type transmission or the second type transmission through higher layer signaling (1101), and checks whether the TA value of the corresponding terminal is larger than a specific limit value (1103).

If the timing advance value of the terminal is smaller than the first TA limit value in a state where the terminal is configures as the first type transmission, the base station transmits the control signal to the terminal, for example, it transmits the control signal in a terminal-specific search space (1105). In this case, it may be determined that the transmission corresponding to the control signal is the first type transmission (1107).

In contrast with this, if the timing advance value of the terminal is larger than the first TA limit value in a state where the first type transmission is configured, the base station transmits the control signal to the terminal, for example, it transmits the control signal in the common search space (1109). In this case, it may be determined that the transmission corresponding to the control signal is the second type transmission (1111).

The fourth embodiment is related to a method for releasing configuration of the first type transmission that the base station configures with respect to the terminal through higher layer signaling if the EA value of the corresponding terminal exceeds a specific TA limit value.

With respect to the first type terminal, the base station configures whether signals to be scheduled correspond to the first type transmission or the second type transmission through higher layer signaling. If the timing advance value of the terminal become larger than the first TA limit value or a value that is obtained by adding or multiplying a specific value to or by the first TA limit value in a state where the terminal is configured as the first type transmission, it may be assumed that the base station and the terminal have released the first type transmission configuration.

Here, releasing of the first type transmission configuration may mean the configuration as the second type transmission. Further, on condition that the timing advance value of the terminal become larger than the first TA limit value or a value obtained by adding or multiplying a specific value to or by the first TA value, it is possible to change and apply the timing advance value of the terminal so that the timing advance value becomes larger than the n-th TA limit value or the value obtained by adding or multiplying the specific value to or by the n-th TA limit value first TA value The TA value of the terminal may be changed by applying a new TA value through reception of a random access response (RAR) from the base station, or by receiving a variation value of the TA value transferred from the base station through the MAC CE.

Although the second to fourth embodiments have been described on the assumption that the base station knows the TA value of the terminal, the embodiments may also be applied even in the case where the base station does not know the TA value of the terminal.

In the present disclosure, determination of a transmission failure with respect to data transmitted by the base station or the terminal may correspond to a case of discontinuous transmission (DTX) (e.g., a case where neither the ACK nor the NACK is received) or a case where the NACK is transferred.

The base station schedules the first type transmission with respect to the terminal for the downlink or the uplink. If the base station fails to detect the second signal that is a response signal of the terminal connected to the first signal corresponding to the scheduled first type transmission, it determines that the transmission of the scheduled first type to the terminal has failed. In this case, if the transmission of the scheduled first type to the terminal has failed N times, the base station determines that the corresponding terminal is in a state where the first type transmission is currently impossible, and schedules only the second type transmission.

Here, the reason why the first type transmission is determined to be impossible is that the channel state toward the terminal is not good, or the sufficient processing time is not secured when the terminal applies the TA value due to a long distance from the terminal. The N times failure of the first type transmission scheduling may be successive or may be accumulatively calculated. Further, the integer N may be a pre-engaged value, but may be a value pre-transferred to the terminal through the higher layer signaling.

Further, the base station may continuously determine that the first type transmission is impossible from the time when it is determined that the first type transmission is impossible due to the N times failure to a predetermined time. In this case, the base station may attempt again the first type transmission with respect to the terminal after the predetermined time.

As an example, if the base station has scheduled the downlink as the first type transmission for the downlink data transmission, but repeats N times that it fails to receive from the terminal a HARQ ACK/NACK feedback corresponding to the downlink data transmitted as the first type in the pre-engaged timing, the base station may transmit the downlink data to the corresponding terminal as the second type transmission. In contrast, if the base station detects the second signal that is the response signal of the terminal connected to the first signal corresponding to the first type transmission, it may determine that the first type transmission is possible.

As another method, in order to find the TA value to be applied by the terminal, the base station may derive physical random access channel (PRACH) transmission from the terminal through the PDCCH order. The base station schedules the first type transmission with respect to the terminal for the downlink or the uplink. In this case, if the base station has failed to detect the second signal that is the response signal of the terminal connected to the first signal corresponding to the scheduled first type transmission, it determines that the first type transmission scheduled to the terminal has failed. If the first type transmission has failed N times, the base station puts down the PDCCH order that is a command for the corresponding terminal to perform the PRACH. The PDCCH order may be a command for commanding the terminal to transmit the PRACH signal through a determined time-frequency resource through a physical layer signal or higher layer signaling.

On the other hand, the N times failure of the first type transmission scheduling may be successive or may be accumulatively calculated. Further, the integer N may be a pre-engaged value, but may be a value pre-transferred to the terminal through the higher layer signaling. Further, the base station may continuously determine that the first type transmission is impossible from the time when it is determined that the first type transmission is impossible due to the N times failure to a predetermined time. After the predetermined time, the base station may attempt again the first type transmission or may put down the PDCCH order again.

Since the base station receives a random access preamble from the terminal corresponding to the PDCCH order, it may calculate the absolute TA value for the terminal based on this. Then, the base station may determine the transmission type for the terminal based on the calculated absolute TA value. In contrast, if the base station receives the second signal that is the response signal of the terminal connected to the first signal corresponding to the first type transmission, it may determine that the first type transmission is possible.

Figure 12:
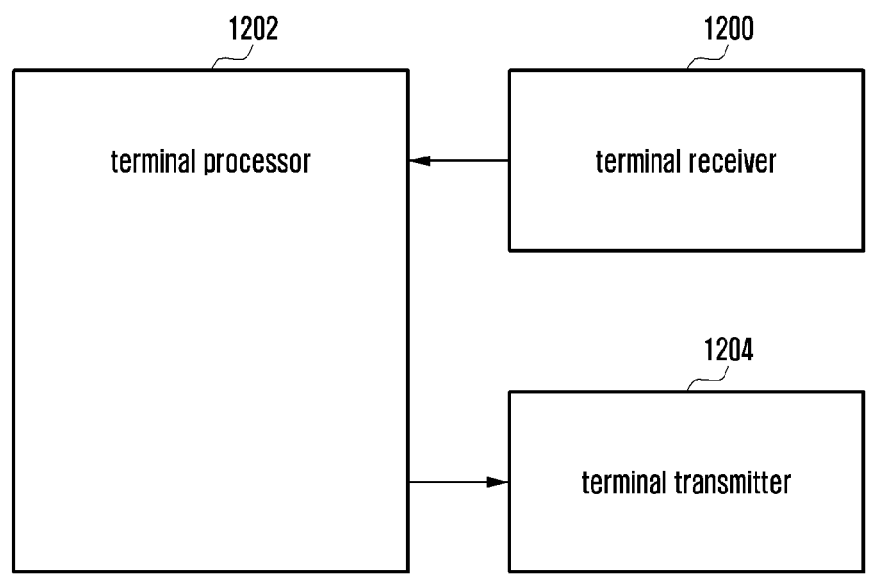
FIG. 12 illustrates the internal configuration of a terminal according to embodiments of the present disclosure.
Figure 13:
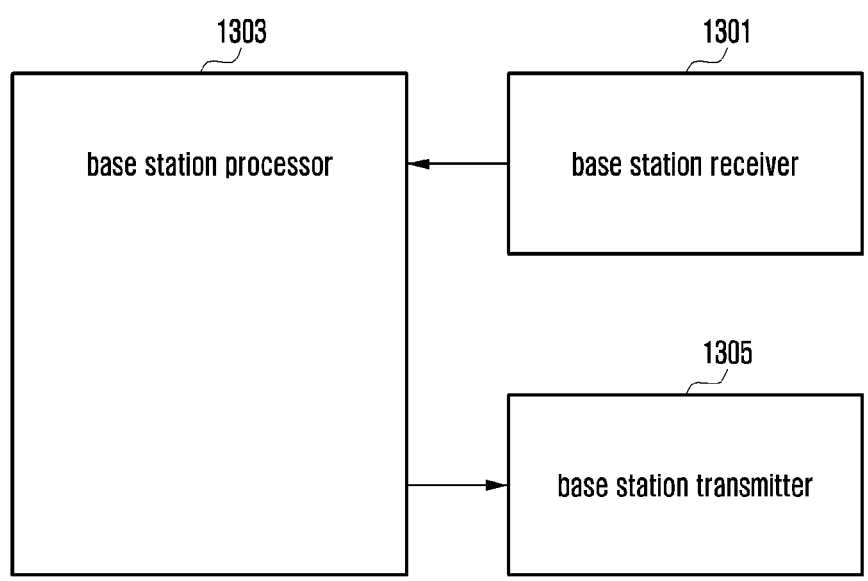
FIG. 13 illustrates the internal configuration of a base station according to embodiments of the present disclosure.

In order to perform the above-described embodiments of the present disclosure, transmitters, receivers, and processors of a terminal and a base station are illustrated in FIGS. 12 and 13. According to the first to third embodiments, a transmission/reception method of a base station and a terminal is provided to determine a method for mapping a control signal for the base station and a method for detecting the control signal for the terminal and to perform the corresponding operations, and in order to perform this, the receivers, processors, and transmitters of the base station and the terminal should operate in accordance with the respective embodiments.

FIG. 12 illustrates the internal configuration of a terminal that performs operations according to the embodiments of the present disclosure.

As illustrated in FIG. 12, a terminal according to the present disclosure may include a terminal receiver 1200, a terminal transmitter 1204, and a terminal processor 1202. In an embodiment of the present disclosure, the terminal receiver 1200 and the terminal transmitter 1204 may be commonly called a transceiver.

The transceiver of the terminal may transmit/receive a signal to/from a base station. The signal may include control information and data. For this, the transceiver may include an RF transmitter up-converting and amplifying a frequency of a transmitted signal, and an RF receiver low-noise-amplifying the received signal and down-converting the frequency of the amplified signal.

Further, the transceiver of the terminal may receive the signal through a radio channel, output the signal to the terminal processor 1202, and transmit the signal output from the terminal processor 1202 through the radio channel. The terminal processor 1202 may control a series of processes so that the terminal can operate according to the embodiments of the present disclosure. For example, the terminal receiver 1200 may receive the signal including the first type transmission configuration information from the base station, and the terminal processor 1202 may select a method for detecting the control signal in accordance with the configuration information and TA values.

FIG. 13 illustrates the internal configuration of a base station that performs operations according to the embodiments of the present disclosure.

As illustrated in FIG. 13, a base station according to the present disclosure may include a base station receiver 1301, a base station transmitter 1305, and a base station processor 1303. In an embodiment of the present disclosure, the base station receiver 1301 and the base station transmitter 1305 may be commonly called a transceiver.

The transceiver of the base station may transmit/receive a signal to/from a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver of the base station may receive the signal through a radio channel, output the signal to the base station processor 1303, and transmit the signal output from the base station processor 1303 through the radio channel.

The base station processor 1303 may control a series of processes so that the base station can operate according to the embodiments of the present disclosure. For example, the base station processor 1303 may select whether to perform the first type transmission with respect to the terminal, determine the TA value of the corresponding terminal, and select a method for mapping the control signal (method for determining a search space to transmit the control signal). Thereafter, the base station transmitter 1305 transmits the control signal in accordance with the determined method for mapping the control signal.

Although preferred embodiments of the present disclosure have been described in the specification and drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein.

Further, if needed, the respective embodiments may be combined with each other to be operated. For example, portions of the embodiments 1 to 4 of the present disclosure may be combined with each other to be operated by the base station and the terminal. Further, although the above-described embodiments are presented based on the FDD LTE system, they may be applied to other systems, such as a TDD LTE system, and 5G or NR system, and other modifications based on the technical idea of the embodiments can be embodied.

As described above, in the present disclosure, the uplink scheduling grant signal and the downlink data signal are called the first signal, and the uplink data signal for the uplink scheduling grant and the HARQ ACK/NACK for the downlink data signal are called the second signal. However, the kinds of the first signal and the second signal as described above are merely exemplary to easily explain the technical contents of the present disclosure and to help understanding of the present disclosure, but are not intended to limit the scope of the present disclosure. That is, it will be apparent to those of ordinary skill in the art to which the present disclosure pertains that other first and second signals can be embodied based on the technical idea of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a base station in a wireless communication system, the method comprising:
    transmitting, to a terminal, a configuration message for setting a transmission type of the terminal to a first transmission type, wherein the transmission type includes the first transmission type and a second transmission type which are determined based on a transmission time interval;
    identifying whether a timing advance value of the terminal is smaller than a predetermined value;
    transmitting, to the terminal, control information associated with the first transmission type in a first search space, based on the timing advance value of the terminal being smaller than the predetermined value; and transmitting, to the terminal, control information associated with the second transmission type in a second search space based on the timing advance value of the terminal being larger than the predetermined value.

2. The method of claim 1,
wherein the first search space is a terminal-specific search space, and
wherein the second search space is a common search space.

3. The method of claim 1,
wherein the first transmission type includes the transmission time interval of a first time,
wherein the second transmission type includes at least one transmission using the transmission time interval of a second time that is longer than the first time, and
wherein a transmission of an uplink signal based on the first transmission type is faster than a transmission of the uplink signal based on the second transmission type, the uplink signal being transmitted in response to a downlink signal.

4. The method of claim 1, wherein the configuration message is a radio resource control (RRC) message.

5. The method of claim 1, wherein the transmission type of the terminal is determined based on the timing advance value of the terminal.

6. A method for a terminal in a wireless communication system, the method comprising:
receiving, from a base station, a configuration message for setting a transmission type of the terminal to a first transmission type, wherein the transmission type includes the first transmission type and a second transmission type which are determined based on a transmission time interval;
identifying whether a timing advance value of the terminal is smaller than a predetermined value;
monitoring control information associated with the first transmission type in a first search space, based on the timing advance value of the terminal being smaller than the predetermined value; and
monitoring control information associated with the second transmission type in a second search space, based on the timing advance value of the terminal being larger than the predetermined value.

7. The method of claim 6,
wherein the first transmission type includes the transmission time interval of a first time,
wherein the second transmission type includes the transmission time interval of a second time that is longer than the first time, and
wherein a transmission of an uplink signal based on the first transmission type is faster than a transmission of the uplink signal based on the second transmission type, the uplink signal being transmitted in response to a downlink signal.

8. The method of claim 6,
wherein the first search space is a terminal-specific search space, and
wherein the second search space is a common search space.

9. A base station in a wireless communication system comprising:
a transceiver configured to transmit and receive signals; and
at least one processor configured to:

transmit, via the transceiver to a terminal, a configuration message for setting a transmission type of the terminal to a first transmission type, wherein the transmission type includes the first transmission type and a second transmission type which are determined based on a transmission time interval;
identify whether a timing advance value of the terminal is smaller than a predetermined value;
transmit, via the transceiver to the terminal, control information associated with the first transmission type in a first search space, based on the timing advance value of the terminal being smaller than the predetermined value; and
transmit, via the transceiver to the terminal, control information associated with the second transmission type in a second search space based on the timing advance value of the terminal being larger than the predetermined value.

10. The base station of claim 9,
wherein the first search space is a terminal-specific search space, and
wherein the second search space is a common search space.

11. The base station of claim 9,
wherein the first transmission type includes the transmission time interval of a first time,
wherein the second transmission type includes at least one transmission using the transmission time interval of a second time that is longer than the first time, and
wherein a transmission of an uplink signal based on the first transmission type is faster than a transmission of the uplink signal based on the second transmission type, the uplink signal being transmitted in response to a downlink signal.

12. The base station of claim 9, wherein the configuration message is a radio resource control (RRC) message.

13. The base station of claim 9, wherein the at least one processor is configured to determine the transmission type of the terminal based on the timing advance value of the terminal.

14. A terminal in a wireless communication system comprising:
a transceiver configured to transmit and receive signals; and
at least one processor configured to:
receive, via the transceiver from a base station, a configuration message for setting a transmission type of the terminal to a first transmission type, wherein the transmission type includes the first transmission type and a second transmission type which are determined based on a transmission time interval;
identify a timing advance value of the terminal;
monitor control information associated with the first transmission type in a first search space, based on the timing advance value of the terminal being smaller than a predetermined value; and
monitor control information associated with the second transmission type in a second search space, based on the timing advance value of the terminal being larger than the predetermined value.

15. The terminal of claim 14,
wherein the first transmission type includes the transmission time interval of a first time,
wherein the second transmission type includes at least one transmission using the transmission time interval of a second time that is longer than the first time, and wherein a transmission of an uplink signal based on the first transmission type is faster than a transmission of the uplink signal based on the second transmission type, the uplink signal being transmitted in response to a downlink signal.

16. The terminal of claim 14,
wherein the first search space is a terminal-specific search space, and
wherein the second search space is a common search space.

* * * * *